United States Patent [19]

Ervin, Jr.

[11] 4,029,740

[45] June 14, 1977

[54] METHOD OF PRODUCING METAL NITRIDES

[75] Inventor: Guy Ervin, Jr., Northridge, Calif.

[73] Assignee: Rockwell International Corporation, El Segundo, Calif.

[22] Filed: Nov. 24, 1975

[21] Appl. No.: 634,687

[52] U.S. Cl. .............................. 423/251; 423/252; 423/254; 423/404; 423/411

[51] Int. Cl.² .................. C01F 15/00; C01G 43/00; C01G 56/00

[58] Field of Search .......... 423/251, 252, 254, 409, 423/411, 5, 11, 19, 21, 56, 59, 65, 75, 81, 84; 148/20

[56] References Cited

UNITED STATES PATENTS

| 3,180,702 | 4/1965 | Lapat | 423/254 |
|---|---|---|---|
| 3,322,510 | 5/1967 | Anselin et al. | 423/254 X |
| 3,345,436 | 10/1967 | Craig | 423/254 X |
| 3,758,669 | 9/1973 | Potter et al. | 423/251 X |
| 3,923,959 | 12/1975 | Bryan et al. | 423/254 X |

FOREIGN PATENTS OR APPLICATIONS 1,249,838  9/1967  Germany ........................ 423/251

Primary Examiner—Richard E. Schafer
Attorney, Agent, or Firm—L. Lee Humphries; Henry Kolin; Clarke E. DeLarvin

[57] ABSTRACT

A method is provided for producing a selected metal nitride utilizing a salt bath. The selected metal is introduced into the salt bath in the presence of gaseous nitrogen and at least a certain amount of a halide of the selected metal. The salt bath is maintained at a temperature above its melting point for time sufficient to form a precipitate of the desired amount of a nitride of the selected metal. In accordance with a preferred embodiment, the pressure is thereafter reduced to less than atmospheric and the temperature increased above the boiling point of the salt for a time sufficient to volatilize the molten salt which is removed to leave a precipitate of the selected metal nitride. The method is particularly applicable to the production of the mononitrides of uranium, plutonium, thorium, and mixtures thereof.

9 Claims, 1 Drawing Figure

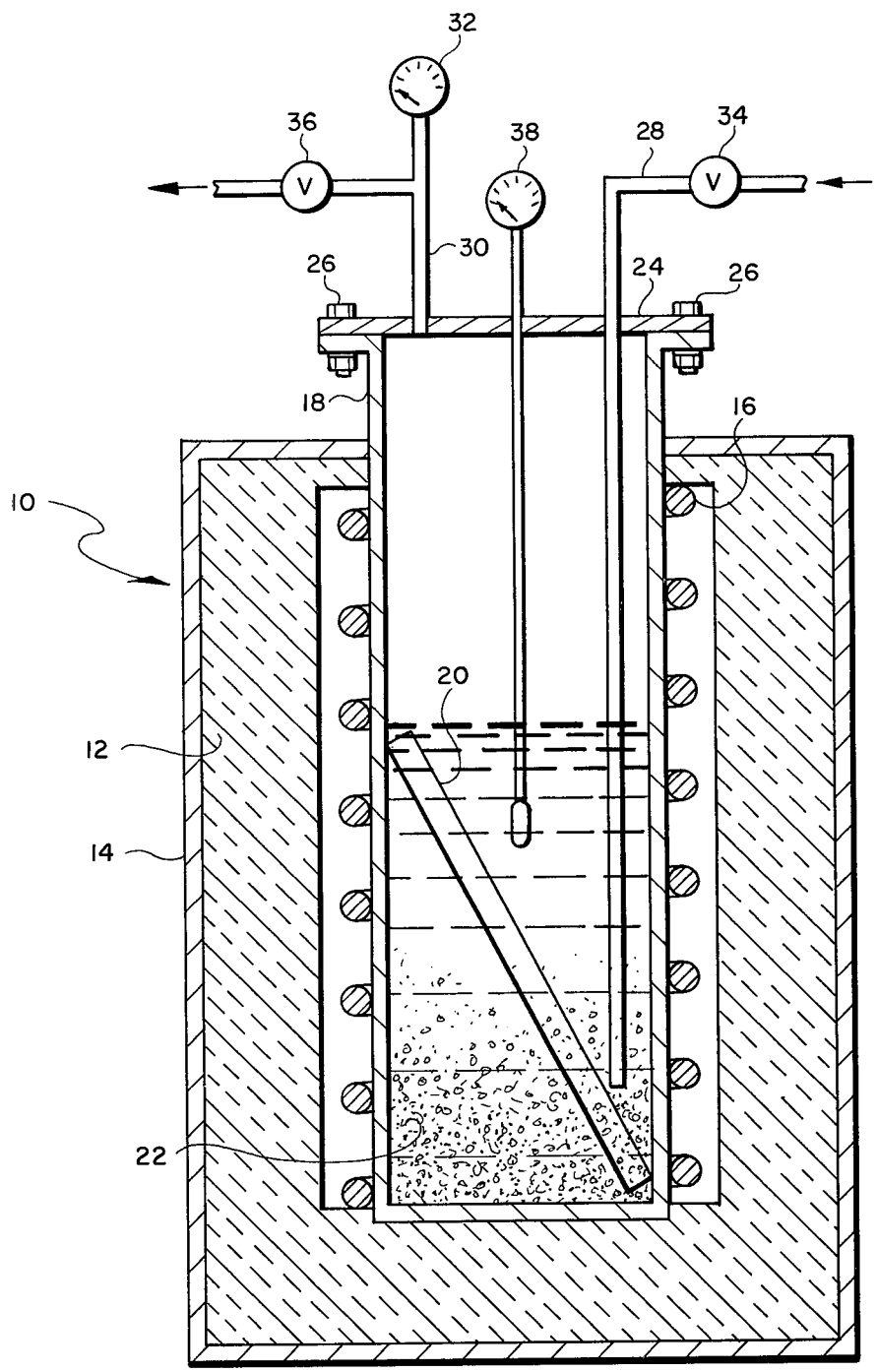

METHOD OF PRODUCING METAL NITRIDES

BACKGROUND OF THE INVENTION

1. Field of the Invention

The present invention relates to the manufacture of refractory compounds. More particularly, the invention relates to the production of the nitrides of the refractory metals, rare earth metals, actinide series metals, and combinations thereof. In its particularly preferred embodiment the invention provides a method for producing a mononitride of thorium, uranium, plutonium, or mixtures thereof, which mononitride is recovered in the form of ultrafine particles ideally suited for sintering to form a dense compact fuel element for a nuclear reactor.

2. Prior Art

It is well known that metals such as vanadium, titanium, thorium, niobium, zirconium, hafnium, tungsten, molybdenum, tantalum, uranium, plutonium, and silicon have refractory compounds including the carbides, nitrides, borides, phosphides, and the like. These compounds are difficult to manufacture as their melting points are high, for example, in the region of 2000°–3000° C. The compounds have many purposes which depend upon their high melting points and chemical and physical characteristics. The compounds of uranium, plutonium, and thorium are of particular interest in view of their potential use as nuclear fuel materials.

Indeed, the excellent physical and nuclear properties of the nitrides of such materials mark them as an excellent fuel for use in a high temperature, high power density nuclear reactor. In the case of uranium nitride, for example, it can be substituted for $UO_2$ in a fuel element and occupy about 30% less volume with an equivalent uranium content. Its high thermal conductivity (on a par with UC), high melting point, and acceptable chemical compatibility are further recommendations for its use as a nuclear fuel. However, the acceptance of this material as a fuel for current commercial power reactors is at least partly contingent upon the overall economy associated with its production and fabrication into a fuel element. One of the principal cost factors involved is the fabrication of the nitride into a densified compact. Specifically, to form a dense compact of the material, it is essential, if it is to be used as a fuel, that it be substantially pure and all in the mononitride form, and additionally, have an ultrafine particle size.

Considerable work has been done in attempting to develop a viable process for the preparation of ultrafine particles of uranium mononitride. In U.S. Pat. No. 2,544,277 it is suggested that uranium first be reacted with hydrogen until it is substantially all converted to a uranium hydride. Thereafter, the uranium hydride is reacted with ammonia or nitrogen at a temperature of from about 200° C to 400° C to form a uranium nitride, which subsequently is calcined at about 1400° C to form a compound corresponding approximately to uranium mononitride.

In U.S. Pat. No. 3,180,702 it is suggested that uranium nitride be formed by reacting finely divided uranium particles with nitrogen in the presence of hydrogen at a temperature between 450° C and 1200° C. Thereafter, the excess nitrogen in the product uranium nitride is removed by heating the uranium nitride in a vacuum at a temperature above about 1000° C to form the mononitride.

U.S. Pat. No. 3,322,510 discloses yet another process for the preparation of certain metallic nitrides. Prior to forming the nitride a surface hydride coating is provided on the selected metal by reacting it with a small quantity of hydrogen, and thereafter the hydride-coated metal is reacted with nitrogen at elevated temperatures to form the nitride.

In East German Pat. No. 30,160 there is disclosed a process for the production of the nitrides of uranium and plutonium utilizing a molten salt (alkali metal halide) bath. In the process disclosed therein, a uranium halide ($UCl_4$) is reacted with ammonium to form a uranium nitride and a byproduct of ammonium chloride. Thus, the process requires that the uranium metal first be reacted or treated to form a uranium halide and then introduced into the bath for reaction with the ammonia. Further, the process also results in an unneeded byproduct, i.e., ammonium chloride.

SUMMARY OF THE INVENTION

The present invention provides a method of producing a selected metal nitride. The method comprises providing a molten salt bath in a reaction zone and introducing the selected metal into the molten salt bath in the presence of nitrogen. There also is provided in the molten salt bath a halide of the selected metal in an amount of at least 10 grams per liter of molten salt. The molten salt bath is maintained at a temperature at which it is molten for a time sufficient to form a precipitate of a desired amount of a nitride of the selected metal. Thereafter the molten salt bath is separated from the precipitated selected metal nitride, and the selected metal nitride is recovered. In a preferred embodiment, the molten salt is removed by reducing the pressure in the reaction zone to less than atmospheric and increasing the temperature above the boiling point of the salt for a time sufficient to volatilize substantially all of the salt. SUch embodiment also facilitates the formation of the lower nitride of the selected metal. Specifically, under such conditions excess nitrogen is removed such that the product nitride is recovered, for example, as the mononitride.

The term "selected metal" as used herein, contemplates the refractory metals, rare earth metals, and the actinide series metals. The term "refractory metals" as used herein, is defined as at least one metal selected from the group consisting of chromium, zirconium, titanium, niobium, tantalum, molybdenum, and tungsten. The rare earth metals are those elements having an atomic number of from 57 thru 71, inclusive. The actinide series comprises elements having atomic numbers 89 thru 103, inclusive. The particularly preferred metals for use in producing a nitride in accordance with the claimed method are uranium, plutonium, thorium, and mixtures thereof. The present invention is particularly useful for the preparation of mixed mononitrides of uranium and plutonium for use as a fuel in a nuclear reactor. Titanium nitride and zirconium nitride are two nitrides which are readily prepared by the present method and are of particular value for their refractory properties combined with their high electrical conductivity and reasonable cost.

It is an advantage of the present invention that the selected metal need not be ground to any particular fine size prior to nitriding. The size of the discrete portions of selected metal is not critical. Indeed, the selected metal may be introduced as a massive body. By a massive body it is meant, in contradistinction to such forms as granules, flakes, or powders, a body having a depth or length along its shortest axis in excess of about 1 cm. Thus, the present invention provides a method wherein selected metal may be introduced a fine granules, pellets or even as massive chunks or in the form of bars, sheets, billets and the like.

The term "salt bath" as used herein refers to an alkali or alkaline earth metal halide containing salt which is maintained at a temperature above its malting point during the nitriding operation. The molten salt may be either a single alkali or alkaline earth metal halide or a mixture of such halides, which may or may not be a eutectic mixture.

Typical examples of binary salt mixtures are sodium chloride-potassium chloride, lithium chloride-potassium chloride, lithium chloride-magnesium chloride, lithium chloride-sodium chloride, lithium bromide-potassium bromide, lithium fluoride-rubidium fluoride, lithium iodide-potassium iodide and mixtures thereof. Two binary salt eutectic mixtures having low melting poins are lithium chloride-potassium chloride (melting point 352° C), and lithium bromide-rubidium bromide (melting point 278° C).

Examples of ternary mixtures useful as the molten salt include calcium chloride-lithium chloride-potassium chloride, lithium chloride-potassium chloride-magnesium chloride, lithium chloride-potassium chloride-sodium chloride, calcium chloride-lithium chloride-sodium chloride, and lithium bromide-sodium bromide-lithium chloride. Ternary eutectic mixtures with particularly low melting points are lithium chloride-lithium fluoride-lithium iodide (melting point 341° C) and lithium chloride-lithium iodide-potassium iodide (melting point 260° C).

Although the ternary eutectic salt mixtures, paticularly those containing the iodides, provide lower melting points, the binary eutectic mixture of lithium chloride-potassium chloride sometimes is preferred on the basis of its relatively low cost and relatively low melting point. The sodium chloride-potassium chloride eutectic generally is preferred in spite of its higher melting point, since it is lower in cost and more easily purified.

To form the desired nitride there obviously must be provided at least a stoichiometric amount of free nitrogen. Generally there is provided a substantial excess of nitrogen, since that which is not consumed in the reaction is readily recoverable. Nitrogen may be provided, for example, by introducing into the reaction zone either nitrogen gas or ammonia. The nitrogen preferably is provided by the introduction of gaseous nitrogen into the reaction zone. In accordance with the present invention, it is not essential that the nitrogen be introduced into the molten salt. For example, it has been found that the method works effectively simply by providing an appropriate amount of gaseous nitrogen as a cover gas over the molten salt. Generally, however, it is preferred to bubble the gas upwardly through the molten salt, as such method of introduction greatly enhances the reaction rate, thus reducing the time required.

It is an essential feature of the present invention that there be provided in the molten salt bath a corresponding halide of the selected metal in an amount of at least about 10 grams per liter of molten salt bath. Generally, the selected metal halide is provided in an amount of from about 10 to 200 gms/liter and particularly good results are obtained when it is present in an amount of from 100 to about 200 gms/liter.

Preferably, the selected metal halide and the molten salt bath are chosen such that the selected metal halide will have a solubility in the bath within the range of from about 10 to 200 grams per liter. In such instances the selected metal halide may be introduced directly into the molten salt bath. Alternatively, a halide gas is introduced into the molten salt bath for reaction with the selected metal to form the necessary amount of selected metal halide. In yet another variant, the selected metal halide in vapor form, is introduced concurrently with the nitrogen, thus providing the required amount. Any halide of the selected metal may be used, however, chloride generally is preferred based upon its lower cost.

The exact mechanism by which the present reaction takes place is not known with certainty, and the inventor does not with to be bound by any particular theory. It is hypothesized that the selected metal, for example, uranium, serves as the uranium source in making the nitride in accordance with the following equations:

$U + 3\ UCl_4 \rightarrow 4\ UCl_3$
$4\ UCl_3 + \frac{1}{2}\ N_2 \rightarrow UN + UCl_4$
Net Reaction $= U + \frac{1}{2}\ N_2 \rightarrow U_n$ It is seen that the uranium halides are regenerated and that only uranium and nitrogen are consumed. It must be appreciated, however, that this is only a hypotheses as to the mechanism of the reaction. Indeed, it may be that the uranium halide or the halide in combination with the molten salt act in some manner as a catalyst, rather than the halide acting as an intermediate in the reaction. It is known with certainty, however, that only the selected metal and nitrogen are consumed in the production of the selected metal nitride. Therefore, unlike the prior art processes, it is not necessary to utilize hydrogen to prepare the metal for nitriding, nor are any unnecessary byproducts formed.

it is another advantage of the present invention that the reaction will occur at relatively low temperatures. Specifically, it is not necessary to exceed the melting point of the selected metal nitride product or even the melting point of the selected metal. Generally, the temperature is limited on the low side only by the melting point of the salt selected for the bath. Depending upon the selection of the particular salt bath, such temperature may be as low as about 250° C. The lithium chloride-potassium chloride eutectic, for example, melts at a temperature as low as about 352° C, and the presence of the selected metal halide may further reduce the melting temperature.

The upper temperature is limited by the boiling point of the selected molten salt. Specifically, if the temperature is so high as to volatilize the molten salt bath, obviously the benefits of the bath would be lost. Generally, it has been found that a temperature of from about 250° to 900° C and preferably a temperature of from 350° to 800° C are sufficient for the formation of the selected metal nitride. Pressure is not critical and substantially any pressure may be utilized, subject, of course, to its effect on the volatilization of the alkali metal halide bath.

The method should be practiced in a closed reaction zone under a substantially inert atmosphere, since many of the selected metals, including their halides or nitrides will react with atmospheric constituents such as oxygen and water vapor and become contaminated.

This is particularly true in the case of the particularly preferred selected metals, i.e., uranium, plutonium, and thorium. The inert atmosphere generally is provided by the nitrogen gas, although, if desired, other non-reactive gases could be used to provide such an inert atmosphere, such as for example, helium, argon, and the like.

The time required to effect the complete reaction of all the selected metal to the desired nitride product will vary, depending upon such things as the manner in which the nitrogen gas is introduced, the reaction temperature, as well as the size and configuration of the discrete portions of selected metal introduced into the reaction zone and the concentration of the selected metal halide. The appropriate time for any given set of conditions is readily determinable by those skilled in the art through routine experimentation.

Still another advantage of the present invention is that the product nitride is precipitated in the form of ultrafine particles. The nitride precipitate is found to have a median particle size of less than about 5 microns, generally from 0.1 to 1.0 microns. Thus, the product is readily amenable to compaction and sintering for use as a fuel element in the case of plutonium, uraniun, thorium and combinations thereof. Indeed, utilizing the product nitride of the present invention, it is possible to form a compact sinter having a density in excess of 90% of that of the nitride.

In accordance with a preferred embodiment of the present invention, after a desired amount of the nitride of the selected metal has been precipitated, the pressure in the reaction zone is reduced to below atmospheric and the temperature increased to above the boiling point of the selected salt whereby the salt is volatilized to facilitate its separation from the precipitated product. A pressure range of from about 1 to 100 mm/Hg generally will suffice with a pressure of less than 10 mm/Hg being preferred. The salt generally is selected to have a boiling point such that it is readily volatilized at a temperature of from about 600° to 1500° C (preferably 600° to 1000° C) at the reduced pressure, and the salt is maintained at such temperature for a time sufficient to volatilize substantially all the salt which is removed from the reaction zone. Such procedure has the added advantage of also moving any excess nitrogen from the selected metal nitride. Thus, the remaining product metal nitride is recoverable as the more dense and thermodynamically stable mononitrile. After removal of the volatilized salt from the reaction zone, the selected metal nitride then is readily recoverable in a substantially pure ultrafine particle form.

BRIEF DESCRIPTION OF THE DRAWING

The invention will be more clearly understood by reference to the description below taken in connection with the accompanying drawing wherein the sole FIGURE is a diagrammatic view in section of an apparatus which may be used in carrying out the method of the present invention.

DETAILED DESCRIPTION OF THE INVENTION

In order that the description may be presented in a more concrete form it will be assumed hereinafter for the sake of convenience that the method is applied to the nitriding of a body of uranium.

Referring to the drawing therein is depicted an oven or furnace designated generally by the reference numeral 10, which comprises a body of insulation 12, surrounded by a metal cover 14 and including a heating means such as an electrical heating coil 16. The reaction zone is defined by an elongated metal housing 18, which is located within furnace 10. Contained within the reaction zone is a bar of uranium metal 20 and a body of salt 22. Metal housing 18 is closed by a cover plate 24, which is in sealing engagement with housing 18 and retained by a plurality of fasteners such as bolts 26. Communication into the initiator of the reaction zone is provided by tube 28, which extends down into the body of salt and tube 30 which opens into the upper portion of the reaction zone. Tubes 28 and 30 are provided with valves 34 and 36, respectively, for isolating the reaction zone from the exterior. Means also are provided for monitoring the pressure and temperature within the reaction zone, such as pressure gage 32 and temperature sensor and indicator 38.

To demonstrate the efficacy of the present method, the following specific example is performed under adverse conditions. A salt mixture comprising 9 gms sodium chloride, 11 gms potassium chloride and 4 gms uranium tetrachloride are placed in housing 18. Also placed in the housing are two bars of uranium metal, ¼ in. × ⅛ in. × 2 in. (total weight 38.4 gms). The cover is secured in place and the reaction zone evacuated through tube 30 and valve 36 to a pressure of about $10^{-3}$ mm/Hg. Thereafter, valve 36 is closed and furnace 10 is brought to a temperature above the melting point of the salt to form a molten bath. After the temperature has stabilized at about 700° C, a measured amount of nitrogen sufficient to raise the pressure in the reaction zone to about 0.9 atmospheres is introduced through valve 36 and tube 30, providing a blanket of nitrogen above the molten salt bath.

As the nitriding reaction takes place, it depletes the amount of nitrogen in the reaction zone, resulting in a gradual pressure drop. The gradual pressure drop is used as a measure of the nitrogen absorbed. At the end of eight hours it is calculated that the reaction has consumed 1000 cc of nitrogen, which would be equivalent to the formation of 22.5 gms of uranium mononitride. At the end of this time the nitrogen is pumped out and the temperature is increased to 900° C for 30 minutes to volatilize the salt. Valve 36 is opened and the volatilized salt removed from the reaction zone.

The uranium metal then is removed, cleaned, dried, and weighed, showing a loss of 19.8 gms, which is equivalent to 20.9 gms of uranium mononitride. The nitriding product is recovered as a fine black powder and is analyzed by x-ray difraction. Predominant lines formed a very sharp pattern for uranium mononitride. The weight of the product powder recovered was 19.2 gms, however, some small quantity had been lost in removing it from the reaction zone. Thus, the three measurements of the quantity of the UN produced are all in substantial agreement within the limitations of the test method utilized.

The black power product has very fine granular size and exhibited strong pyrophoric behavior which is indicative of ultrafine uranium mononitride. A portion of the product is examined under an electron microscope. The particles appear to have a median size of substantially less than 1 micron and indeed, many discrete particles appear as small as 0.1 microns in diameter.

It is seen that even under the most adverse conditions, i.e., when the metal is introduced as a massive body and the nitrogen gas is introduced above the bed of molten salt, the present method still produces uranium mononitride as an ultrafine particle particularly well-suited for compaction and sintering for use as a fuel element in a nuclear reactor. It will be appreciated that the rate of reaction would be greatly enhanced if the metal were introduced as smaller chips or chunks and the nitrogen gas were bubbled through the molten salt, i.e., by introduction through tube 28 and valve 34, rather than tube 30 as previously described.

It will be understood that the invention is not limited in any sence to the form of embodiment which has been described and illustrated, but rather is intended to include within its scope the various alternative forms which will be apparent to those skilled in the art.

What is claimed is:

1. A method of producing a selected nitride comprising the steps of:
   a. providing a salt bath in a reaction zone;
   b. introducing the selected metal into the salt bath in the presence of gaseous nitrogen;
   c. providing a halide of the selected metal in an amount of at least 10 gm per liter of salt;
   d. maintaining the salt bath at a temperature above its melting point and below its boiling point for a time sufficient for a desired amount of the selected metal to be reacted and form a precipitate of a nitride of the selected metal;
   e. removing the salt from the reaction zone; and
   f. recovering the selected metal nitride.

2. The method of claim 1 wherein the salt is removed from the reaction zone by reducing the pressure in the reaction zone to from about 1 to 100 mm/Hg and increasing the temperature above the boiling point of the salt for a time sufficient to volatilize the salt and the volatilized salt is removed from the reaction zone.

3. The method of claim 1 wherein the gaseous nitrogen of step (b) is provided by introducing gaseous nitrogen into the lower portion of the salt bath while the salt is maintained in a molten state.

4. The method of claim 1 wherein the selected metal halide is provided by introducing an elemental halide gas into the reaction zone for reaction with the selected metal.

5. The method of claim 1 wherein the salt comprises an alkali metal chloride.

6. The method of claim 1 wherein such selected metal is selected from the actinide series of elements having an atomic number of from 89 thru 103, inclusive.

7. A method of producing a selected metal nitride comprising the steps of:
   a. providing a molten salt bath in an inert atmosphere in a closed reaction zone;
   b. introducing the selected metal into the molten salt bath in the presence of gaseous nitrogen, said selected metal being selected from the group consisting of plutonium uranium, thorium, and mixtures thereof;
   c. providing a halide of the selected metal in an amount of at least 10 gms per liter of molten salt;
   d. maintaining the molten salt bath at a temperature above its melting point and below its boiling point, said temperature being within the range of from 250° to 900° C, for a time sufficient for a desired amount of the selected metal to be reacted to form a precipitate of a nitride of the selected metal;
   e. reducing the pressure in the reaction zone to less than about 10 mm/Hg and increasing the temperature above the boiling point of the salt, said temperature being within the range of from about 500° to 1500° C, for a time sufficient to volatilize the molten salt;
   f. removing the volatilized salt from the reaction zone; and
   g. recovering the selected metal mononitride as a fine precipitate having a particle size of less than 5 microns.

8. The method of claim 7 wherein the gaseous nitrogen of step (b) is provided by introducing gaseous nitrogen into a lower portion of the salt bath while it is maintained in a molten state.

9. The method of claim 7 wherein the selected metal halide is provided by introducing an elemental halide gas into the reaction zone for reaction with the selected metal.

* * * * *